United States Patent [19]
Di Blasi

[11] 3,887,218
[45] June 3, 1975

[54] COLLAPSIBLE VEHICLE

[76] Inventor: Rosario Di Blasi, Via Messina 6, Francofonte, Italy

[22] Filed: Feb. 4, 1974

[21] Appl. No.: 439,031

[30] Foreign Application Priority Data
Feb. 28, 1973 Italy .................................. 20983/73

[52] U.S. Cl. ................... 280/278; 180/32; 280/284
[51] Int. Cl. ............................................. B60k 15/00
[58] Field of Search ................... 280/278, 287, 284; 180/25 A, 32

[56] References Cited
UNITED STATES PATENTS

| | | | |
|---|---|---|---|
| 1,610,016 | 12/1926 | Kuchta | 280/278 |
| 2,777,711 | 1/1957 | Yokomaki | 280/287 |
| 3,354,975 | 11/1967 | Stuart | 280/278 X |
| 3,354,976 | 11/1967 | Camps | 280/287 X |
| 3,572,757 | 3/1971 | Camps | 280/278 |
| 3,623,749 | 11/1971 | Jensen | 280/278 |

FOREIGN PATENTS OR APPLICATIONS 867,505  8/1941  France ............................. 280/278

*Primary Examiner*—Kenneth H. Betts
*Attorney, Agent, or Firm*—Steinberg & Blake

[57] ABSTRACT

Collapsible vehicle, preferably two-wheeled and powered vehicle including a saddle, comprising a frame formed of at least one articulated quadrilateral connected by at least one control rod to at least one lever joining the saddle to one side of the articulated quadrilateral, whereby the rotation of the saddle and lever as well will cause through the lever the deformation of the articulated quadrilateral.

8 Claims, 7 Drawing Figures

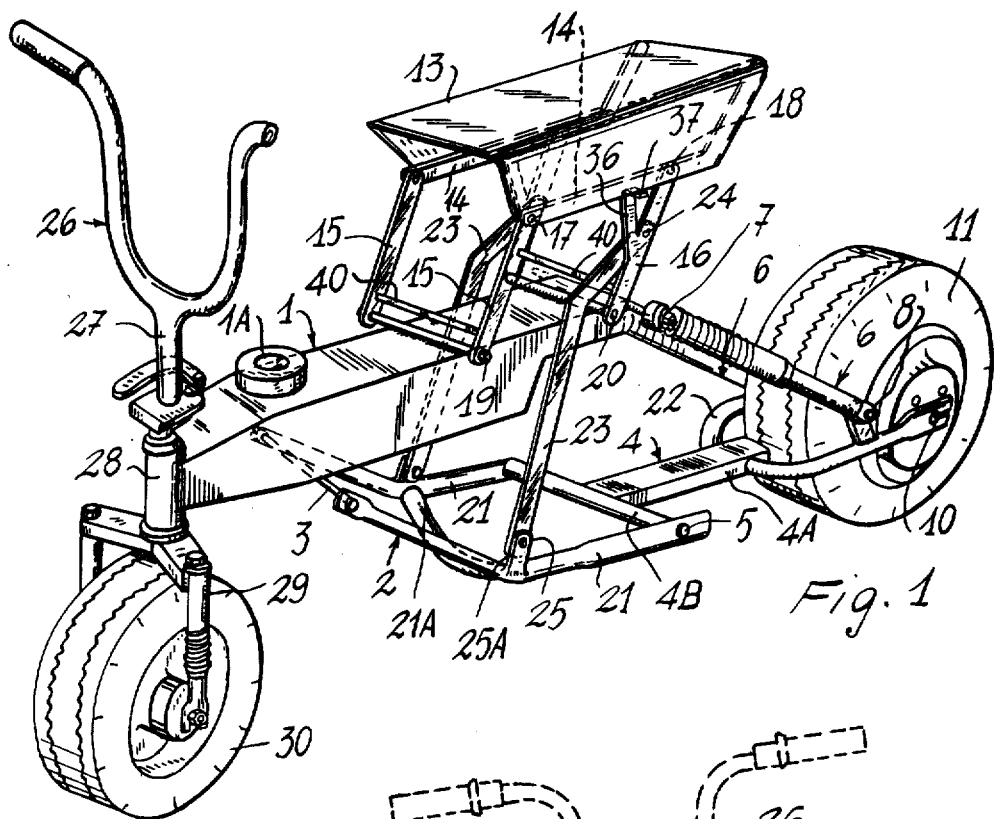
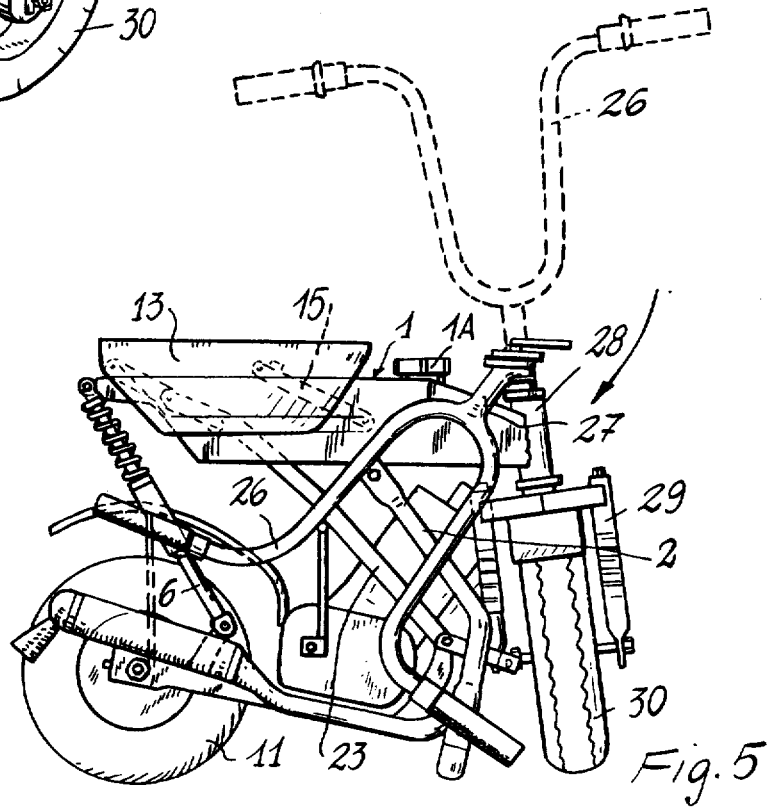

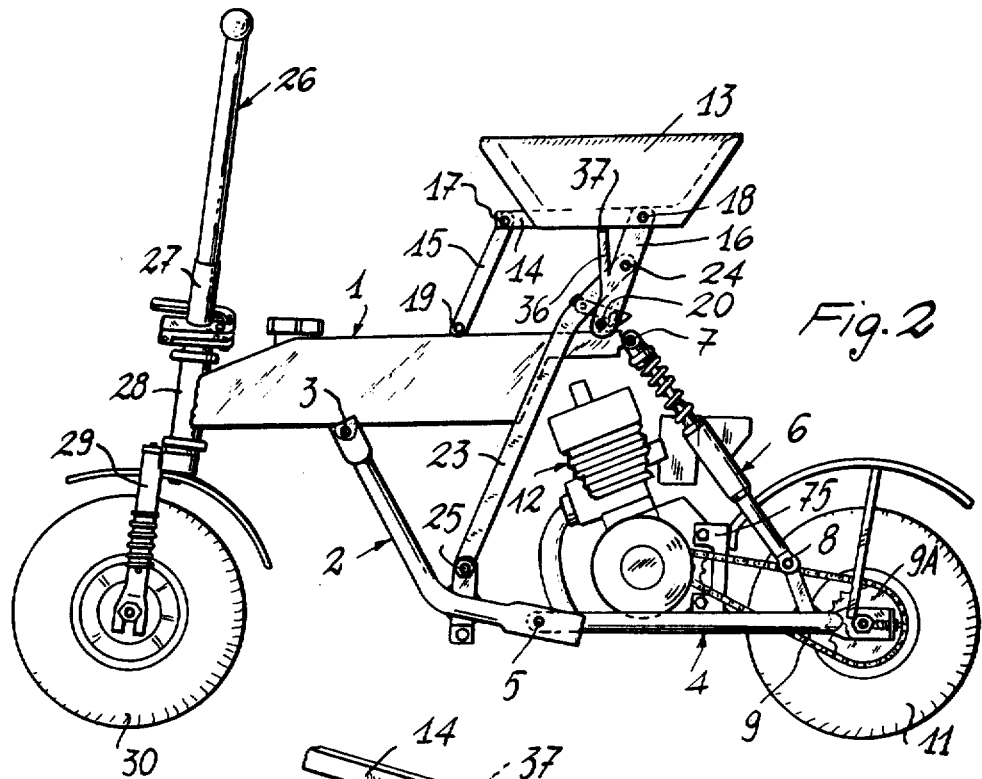
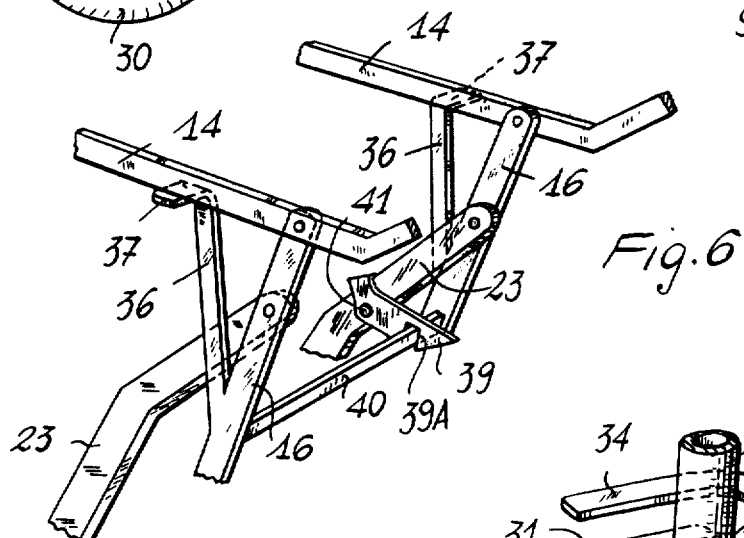
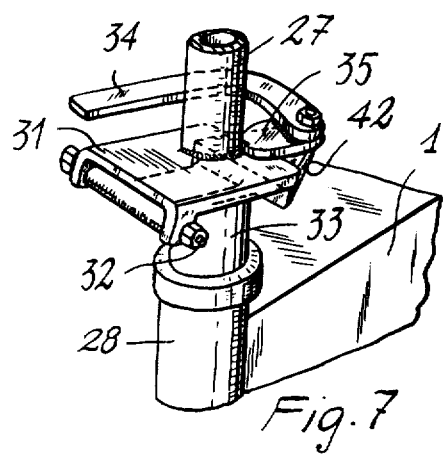

COLLAPSIBLE VEHICLE

This invention relates to a collapsible vehicle, preferably a two-wheeled type of vehicle, the wheels of which are power or muscular strength operable.

A great deal of vehicles are known (such as bicycles and motor-cycles) capable of being collapsed to provide a high reduction in overall size in order to facilitate transportation and garaging or parking thereof. However, for any of a number of reasons, the proposed approaches are not completely satisfactory, for instance, either because the reduction in overall size provided by collapsing the vehicle is not sufficient, or because the operations for collapsing or laying out the vehicle are relatively complicated and require tools, or because of the need of structurally complicated pieces or details, or because the adopted solutions are particularly expensive.

It is an object of the present invention to provide such a collapsible vehicle that its overall size can be substantially reduced, which vehicle is additionally of a low cost, simple construction and easy control.

A collapsible vehicle, preferably two-wheeled and powered vehicle including a saddle, is characterized according to the invention by comprising a frame formed of at least one articulated quadrilateral connected by at least one control lever to at least one lever joining the saddle to one side of the articulated quadrilateral, whereby the rotation of the saddle and lever as well will cause through said lever the deformation of the articulated quadrilateral.

The invention will be more clearly understood from the following detailed description of an exemplary embodiment shown in the accompanying drawings in which:

FIG. 1 is a schematic perspective view showing a motor bicycle at use conditions, the engine, drive system and some detail elements having been omitted;

FIG. 2 is a side view of the motor bicycle shown in FIG. 1;

FIG. 5 is still a side view showing the motor bicycle when the same is completely folded, that is when the overall size of said motor bicycle is minimized;

FIG. 6 is a persepective view showing a detail relating to the saddle support and connecting means between said saddle support and the motor bicycle frame; and FIG. 7 is a perspective view showing a detail relating to the handle bar locking means.

Figure 3:
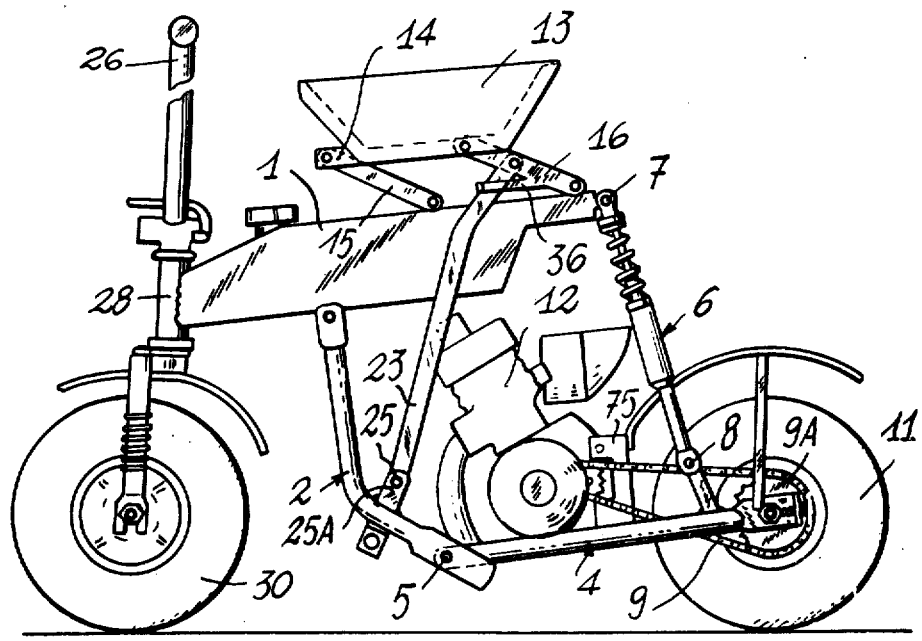
FIG. 3 is a side view showing the motor bicycle at a stage where the frame folding is commenced.

The vehicle, as shown by way of example in the accompanying drawings, is a two wheel powered motor bicycle. The vehicle herein described comprises inter alia: (a) a frame comprising two parallel identical articulated equilaterals as basic elements; (b) a collapsible or foldable handle bar; (c) a foldable saddle carried on articulated parallelograms.

More particularly, the frame comprises:

1. a top portion designated at 1 and forwardly carrying a steering tube member 28, wherein the assembly comprising the handle bar 26, front fork 29 with the front wheel 30 of the vehicle is conventionally rotably mounted, and also carrying the assembly comprising the saddle 1. The top portion 1 is made of metal plate and particularly it also serves as a tank, the closure plug of which is designated at 1A;

2. a bottom portion, designated at 4, comprising the rear fork 22 carrying at 10 the rear wheel 11, and also comprising a plate 4A serving as support for the engine 12, said bottom portion 4 terminating with a tubular cross piece 4B rotably mounted about an axis 5 which is arranged and affixed to the end of arms 21 of a front portion 2 which is part of the frame;

3. said front portion 2 is pivoted at the other end on an axis 3 affixed to the underside of portion 1, said portion 2, as best shown in FIG. 1, particularly comprises a small frame member formed of two arms 21 which are interconnected by means of a cross piece 21A;

4. a rear portion 6 connecting said portion 1 with portion 4 through pivot pins 7 and 8, in this particular embodiment said portion 6 comprising two shock absorbers with coaxial helical springs 6A.

As it will be readily seen from the drawings, the above described portions 1, 2, 4 and 6 generate two symmetrical quadrilaterals which are articulated at points 3, 5, 7 and 8.

The vehicle also comprises a handle bar 26, the column of which comprises two portions 27 and 33 pivoted to each other at 32. Particularly, the pivot or hinge comprises the plates 31 and 42 at the ends adjacent said portions 27 and 33, respectively, the pin 32 carried by the plate 42, and a locking mechanism for said hinge (FIG. 7), including a lever 34 rotably mounted on an extension of said plate 42 and secured to a tab 35 overlying said plate 31.

The handle bar 26 is foldable relatively to the front fork 29 by means of said connecting hinge between the portions 27 and 33, that is it can be rotated about the hinge pin 32, the geometrical axis of which is not horizontal, but suitably inclined (FIG. 2).

Reference numeral 13 designates a foldable saddle of overturned U shape, the size of which being such that it can overly the portion 1 (FIG. 4) when the vehicle is folded or collapsed.

Two parallel side arms 14 are part of the saddle structure, levers 15 and 16 being pivoted thereto at 17 and 18, respectively, while the other ends of said levers are pivoted at 19 and 20 to axes attached to the tank 1. These levers 15 and 16 are the sides of an articulated quadrilateral, and preferably an articulated parallelogram.

A rod 23 is pivoted in 24 at an intermediate location of each arm 16, at its other end said rod 23 being pivoted at 25 to said portion 2 at lugs 25A of the latter.

Therefore, it will be evident that should an operator by acting on the saddle 13 cause the arms 16 to rotate in a counterclockwise direction (as seen in FIG. 3) relative to portion 1, through said rods 23 an action would be simultaneously performed on the above described articulated quadrilateral 1, 2, 4 and 6 comprising the main frame.

The engine 12 is secured in any conventional manner on the plate 4A, such as by a support 75, and through a chain 9 drives the rear wheel 11, having to this purpose a gear wheel 9A mounted on the axis thereof.

Under normal operating conditions the vehicle is as shown in FIGS. 1 and 2.

On the other hand, when the vehicle is not being used and when desiring to reduce the overall size, the operator will move the saddle 13 in counterclockwise direction (FIG. 3), thus causing through said rods 23 a deformation in said articulated quadrilateral 1, 2, 4 and 6.

Figure 4:
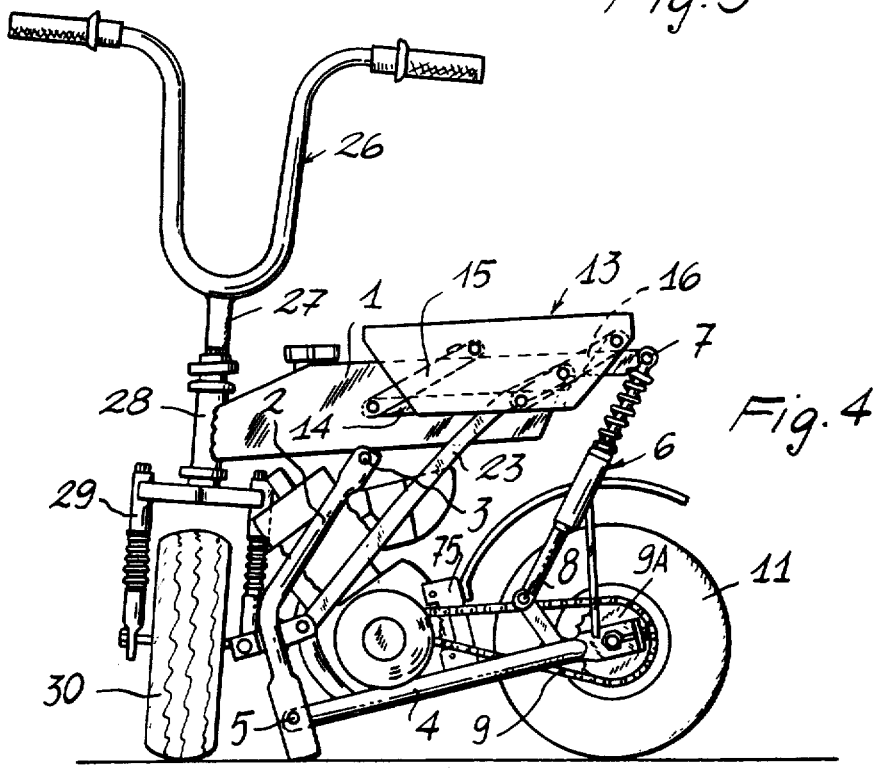
FIG. 4 is still a side view showing the motor bicycle at a next stage, where the motor bicycle is further folded and hence the overall size thereof is further reduced.

The saddle 13 and articulated quadrilateral 1, 2, 4 and 6 then attain the conditions shown in FIG. 4, in which the quite substantial reduction in the vehicle overall size is apparent.

On the other hand, the front wheel can be arranged at the minimum overall size position (as shown in FIGS. 4 and 5) by rotating the handle bar through an angle of about 90°.

Finally, also the handle bar can be brought to the minimum overall size position (FIG. 5) owing to the hinge shown in FIG. 7. To this end, it will suffice to release said tab 35 from the plate 31 by rotating the lever 34 and the handle bar about the axis 32.

This is achievable in that the front wheel has been previously arranged at the minimum overall size position, as above stated, and the axis of said handle bar hinge is suitably inclined relative to the horizontal.

Referring again to the saddle 13, it will be seen that each of said arms 16 are provided with a branch 36 which at the end is bent in 37. When the vehicle is at the attitude of use conditions, the arms 14 of the saddle 13 rest on said ends 37, thereby allowing to maintain the saddle at blocked condition and accordingly the articulated quadrilateral 1, 2, 4 and 6.

The weight of a user sitting on the saddle will press the latter against the branches 36 and further ensure the stiffening for the main frame of the motor bicycle.

However, in order to provide for enhanced safety, any locking system could be provided, which in the embodiment shown comprises a lever 39 (FIG. 6) pivoted at 41 on one of said rods 23.

Said bevelled end lever engages through a notch or slit 39A a joining cross piece 40 fast with said levers 16 and inhibits any movement of the saddle and the main frame as well. As apparent, when desiring to use the motor bicycle, the lever 39 should be released.

What I claim is:

1. A collapsible vehicle, preferably two-wheeled and powered vehicle including a saddle, comprising a frame formed of at least one articulated quadrilateral connected by at least one control rod to at least one lever joining said saddle to one side of said articulated quadrilateral, whereby the rotation of the saddle and lever as well will cause through said lever the deformation of said articulated quadrilateral.

2. A vehicle as set forth in claim 1, wherein said articulated quadrilateral is spatial and comprises a first side for the rear wheel supporting fork, a second side carrying the mounting means for the handle bar and front wheel, a third side comprising the rear suspension, and a fourth side connecting the first side with the second side.

3. A vehicle as set forth in claim 2, wherein said control rod is connected to said fourth side of the quadrilateral.

4. A vehicle as set forth in claim 2, wherein said second side comprises a tank.

5. A vehicle as claimed in claim 2, wherein said handle bar is connected to the front fork by a hinge having an axis inclined to the horizontal, a locking device being provided for locking said hinge.

6. A vehicle as set forth in claim 2, wherein said saddle is carried by the second side of the frame through an articulated quadrilateral.

7. A vehicle as set forth in claim 2, wherein one side of the articulated quadrilateral carrying the saddle has an extension for the saddle support.

8. A vehicle as set forth in claim 2, wherein means are provided for removably locking the saddle at use position.

* * * * *